OR 4,515,434

United States Patent [19]
Margolin et al.

[11] Patent Number: 4,515,434

[45] Date of Patent: May 7, 1985

[54] FIBER OPTIC CONNECTOR

[75] Inventors: Mark Margolin; Igor Grois, both of Lincolnwood; Peter K. Herdeg, Forest Park; John P. Nijman, Wheaton, all of Ill.

[73] Assignee: Allied Corporation, Morris Township, N.J.

[21] Appl. No.: 473,415

[22] Filed: Mar. 9, 1983

[51] Int. Cl.³ .............................................. G02B 7/26
[52] U.S. Cl. .................................. 350/96.21; 350/96.20
[58] Field of Search ............... 350/96.20, 96.21, 96.22, 350/96.23

[56] References Cited

U.S. PATENT DOCUMENTS

| | | | |
|---|---|---|---|
| 3,954,338 | 9/1974 | Hennel et al. | 356/138 |
| 4,045,121 | 8/1977 | Clark | 350/96.21 |
| 4,101,197 | 6/1976 | Kent et al. | 350/96.17 |
| 4,101,198 | 6/1976 | Heldt | 350/96.20 |
| 4,247,163 | 1/1981 | Lumpp et al. | 350/96.21 |

Primary Examiner—William L. Sikes
Assistant Examiner—Akm E. Ullah
Attorney, Agent, or Firm—Roger H. Criss; Roy H. Massengill; John Hoffman

[57] ABSTRACT

A fiber optic connector is disclosed for optically coupling a pair of fiber optic cables or a single fiber optic cable and a light source or detector. A terminal member includes a pair of identical matching halves defining a through hole extending axially therethrough. The through hole has a first portion extending through a mating end of the terminal member and sized to snugly receive a length of the fiber core stripped of the outer coating and properly positioning the core with respect to the mating end of the terminal member. The through hole has a second portion extending through a rear end of the terminal member and sized for receiving the outer coating of the fiber optic cable. Projections are formed in the second portion of the through hole for clamping the outer coating to prevent lengthwise movement of the fiber optic cable relative to the terminal member. A ferrule member is positionable over the rear end of the terminal member for biasing the projections into clamping engagement with the outer coating of the fiber optic cable.

35 Claims, 8 Drawing Figures

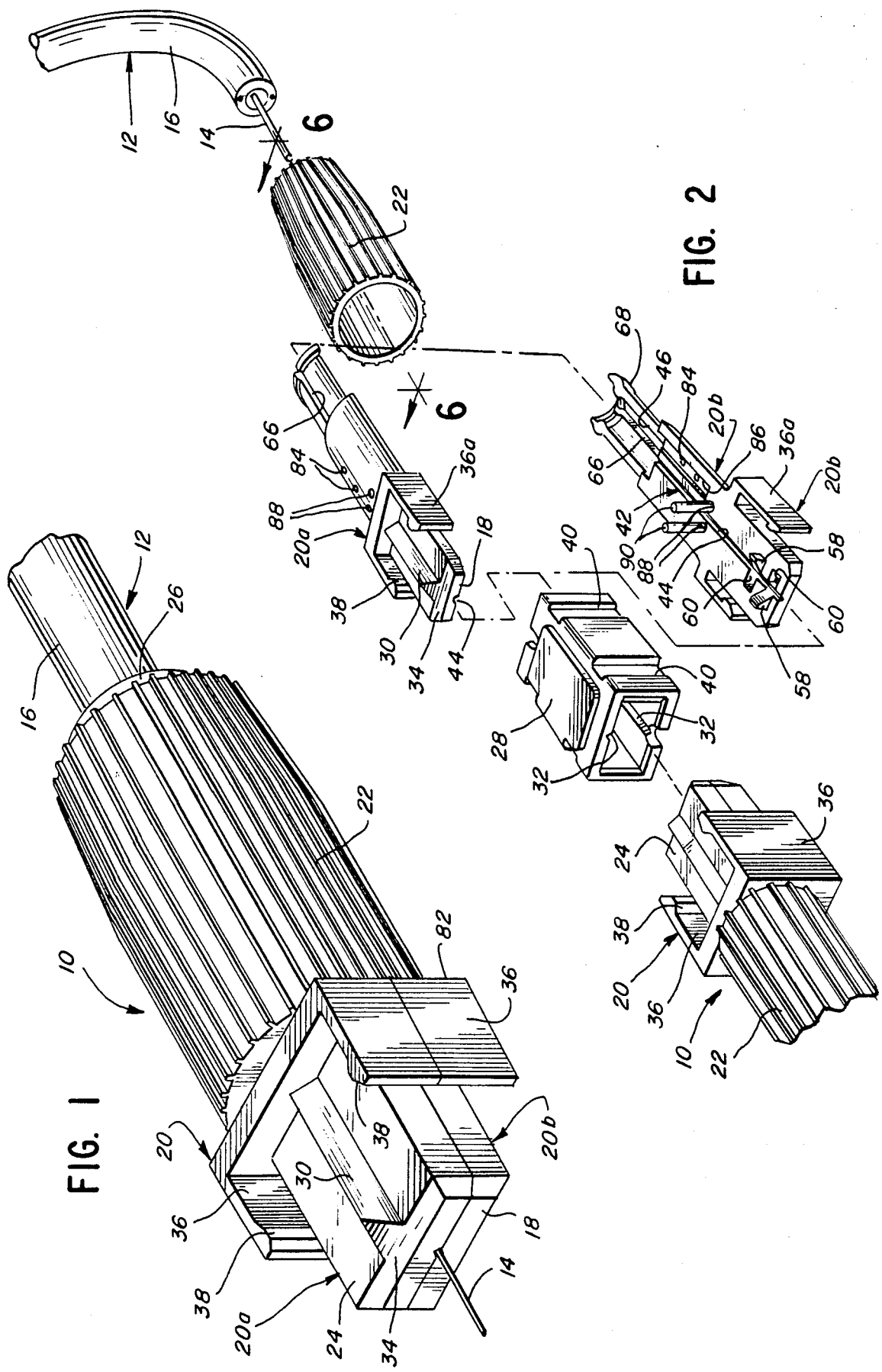

FIBER OPTIC CONNECTOR

BACKGROUND OF THE INVENTION

This invention relates generally to fiber optic connectors and, more particularly, to a fiber optic connector for coupling a pair of fiber optic cables or a single fiber optic cable and a light source or detector in a separable in-line connection.

It is generally known in the industry that a fiber optic cable generally includes an optical fiber surrounded by a coating or "jacket", with strength members extending longitudinally between the optical fiber and the outer coating or jacket. An optical "fiber" conventionally includes a core surrounded by a cladding, both of which normally are of glass but with different indexes of refraction. However, in the specification and claims herein the terms "core" or "fiber core" will be used to denote this composite element of the fiber optic cable.

The terminal end surface of an inner fiber core of a fiber optic cable for use in lightwave transmission must be flat and highly polished to minimize insertion losses. The inner fiber core typically must also be axially, laterally and angularly aligned within certain parameters to establish an excellent optical coupling between two fiber optic cables. The success achieved in the development and production of fiber optic cables has therefore focused strongly upon low loss connectors and couplers for such cables including in-line connectors. The ability to design, manufacture, deploy and service a data transmission line, for instance, requires suitable connectors in order to assure the continued progress of the fiber optics field. Accordingly, connectors for this and other applications must be developed which can be used without any significant increase in insertion losses.

Many fiber optic connectors presently available are precision, expensive instruments providing very low insertion losses, but they are designed for certain applications such as long distance applications in telephonic systems and in other applications requiring extremely low insertion losses where expensive low loss connectors may be employed. It has been found, however, that expensive low loss connectors are not always well suited for applications requiring a large number of connectors where very expensive connectors are not economically feasible. For instance, in such applications as computers, cable television and other data transmission applications, a large number of fiber optic cables are employed, and there is a need for low cost, low loss fiber optic connectors which minimize insertion losses due to off-centering of the fiber core relative to the outer dimensions of the connector or terminal member. It is well known in such applications to use low cost fiber optic cables in which the inner fiber core often is not concentric with the outer coating or cladding. Of course, this non-concentricity has a tendency to lead to excessive insertion losses when a connector that utilizes the outer coating or cladding as a jigging surface is put into a data transmission line.

As stated above, alignment of the fiber core is important to minimize insertion losses, but most connectors which are effective to properly position or center the core with respect to the mating terminal end of the connector or terminal member are very expensive instruments. Such connectors often employ bushings, centering rollers, internal sleeves and the like for properly positioning or centering the core. Some such connectors employ expensive manufacturing steps to apply epoxy within the connector to effect proper centering of the core.

This invention is directed to solving these problems by providing a new and improved fiber optic connector and means of centering or properly positioning optical fibers or inner fiber cores of fiber optic cables with respect to the mating end of the connector. The fiber optic connector of this invention also is directed to the problems of reducing manufacture and assembly costs as well as providing a connector which, when assembled, precludes axial movement of the fiber optic cable relative to the connector to insure that proper positioning of the fiber core is maintained during use.

SUMMARY OF THE INVENTION

In accordance with the invention, a fiber optic connector is provided for optically coupling a pair of fiber optic cables or a single fiber optic cable and a light source or detector. A terminal member has a through hole extending axially therethrough. The through hole has a first portion extending through a forward mating end of the terminal member and sized to snugly receive a length of the fiber core stripped of the outer coating and properly positioning the core with respect to the mating end of the terminal member. The through hole has a second portion extending through a rear end of the terminal member and sized for receiving the outer coating of the fiber optic cable. Means is provided in the second portion of the through hole for clamping the outer coating to prevent lengthwise movement of the fiber optic cable relative to the terminal member. Means also are provided for clamping the fiber core and the strength member whereby all elements of the fiber optic cable are securely held.

The terminal member itself comprises a pair of identical matching halves separable along a parting line coincident with the axis of the through hole. The first portion of the through hole is defined by axially extending V-shaped grooves in the matching halves for centering the fiber core with respect to the mating end of the terminal member. Being identical, the matching halves and the complementary V-shaped grooves provide for precise alignment of the fiber core with respect to the outer dimensions of the connector or terminal member.

The means for clamping the outer coating of the fiber optic cable comprises projecting means within the second portion of the through hole. A ferrule member is positionable over the rear end of the terminal member for biasing the projecting means into clamping engagement with the outer coating of the fiber optic cable. To this end, the rear portion of the terminal member is resilient to facilitate the clamping action of the projecting means. Complementary engaging means is provided between the rear portion of the terminal member and the ferrule member to provide a snap-fit of the ferrule member onto the rear portion of the terminal member.

Other features of the connector of this invention include guide means on at least one of the matching halves of the terminal member adjacent the first portion of the through hole for guiding the fiber core transversely thereinto, as well as complementary alignment means on the matching halves to facilitate proper mating of the halves. More particularly, the alignment means comprises a protruding boss on at least one of the matching halves and a complementary recess for receiving the boss on the other of the matching halves. The boss is located adjacent the first portion of the through hole and has a canted surface directed toward the first portion for guiding the fiber transversely thereinto during assembly of the halves of the terminal member.

Another feature of the invention includes a method of molding the matching halves of the connector by using a common core pin to form the fiber grooves in the matching halves.

The connector herein is simple and of low cost, can be fabricated entirely of molded plastic material and has very low insertion loss. The connector is capable of holding, clamping or gripping all elements of a fiber optic cable without any extraneous interior components such as bushings, centering rollers, internal sleeves and epoxy materials. The connector is easy to assemble because of its open design and is reusable for repeated assembly. The identical terminal halves provide for precise alignment of the fiber core with respect to the outer dimensions of the terminal member or connector. The connector is readily applicable for separable in-line applications and, once assembled, the connector substantially eliminates all relative movement between all elements of the fiber optic cable itself as well as between the cable elements and the connector components.

Other features and advantages of the invention will be apparent from the following detailed description taken in connection with the accompanying drawings.

DESCRIPTION OF THE DRAWINGS

FIG. 1 is a perspective view of a fiber optic connector in accordance with the present invention;

FIG. 2 is an exploded perspective view of two fiber optic connectors of the invention for an in-line separable connection utilizing an intermediate female socket or sleeve;

DETAILED DESCRIPTION OF THE PREFERRED EMBODIMENT

Figure 3:
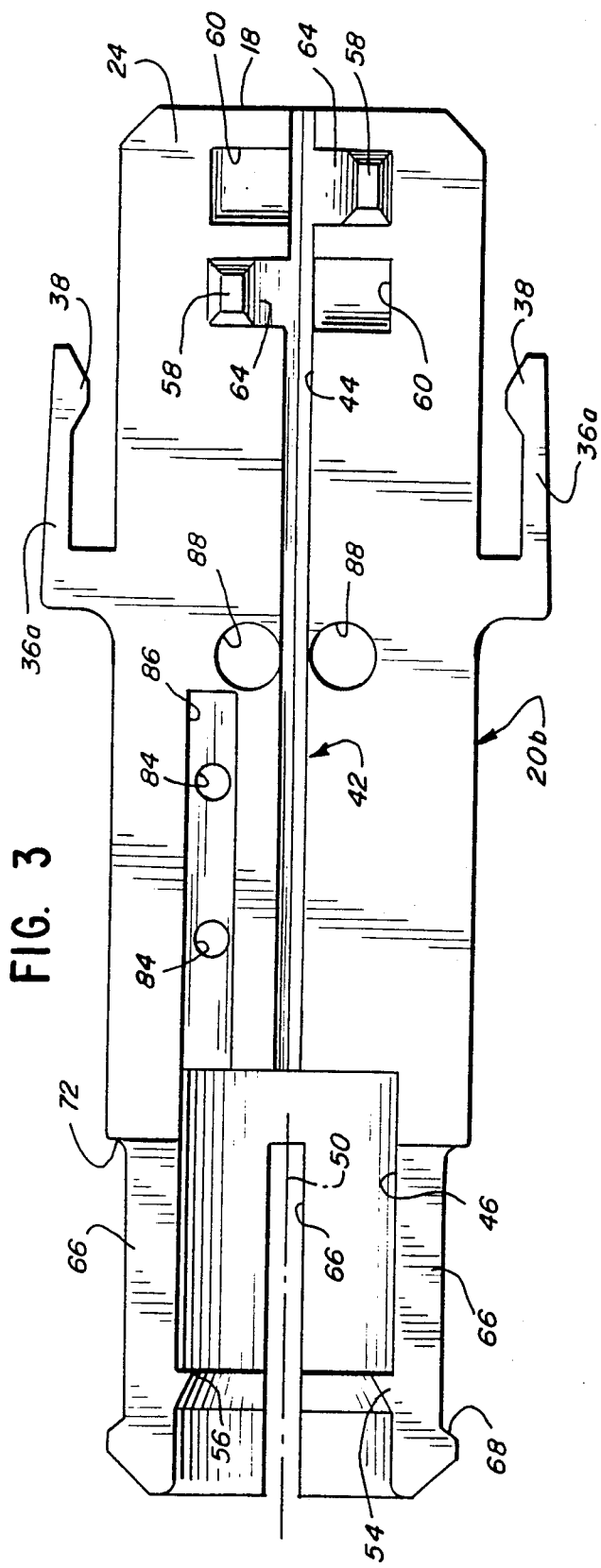
FIG. 3 is a top plan view, on an enlarged scale, illustrating the interior of one of the matching halves of the connector terminal member.

Referring to the drawings in greater detail, and first to FIG. 1, a fiber connector, generally designated 10, in accordance with the invention is illustrated in assembled condition and receiving a fiber optic cable, generally designated 12. The cable includes an inner fiber core 14 surrounded by an outer coating or jacket 16. The cable is illustrated with the fiber core protruding outwardly from a flat mating end surface 18 of the connector. The protruding portion of the fiber core, after assembly within the connector, is cleaved flush with the flat mating end surface. A novel method of removing the protruding portion of the fiber core without the necessity of polishing the end of the fiber is disclosed in an application which is being cofiled herewith, entitled "Method of Terminating Fiber Optic Connector Without Polishing Optical Fiber", to Mark Margolin, assigned to the assignee of the present invention, and which is incorporated herein by reference.

Connector 10 includes a terminal member, generally designated 20, and a ferrule member 22. Terminal member 20 comprises two identical matching halves, generally designated 20a and 20b, defining a forward mating end 24 of the terminal member. Ferrule member 22 is designed for securing over a rear end 26 of the terminal member.

FIG. 2 illustrates two terminal members 10 in exploded condition to better illustrate the respective components thereof, as described above, and in conjunction with an intermediate female socket or sleeve member 28. The sleeve member is open at both ends to receive the forward mating ends 24 of the mating connectors and holding the connectors in separable in-line mating condition.

In order to maintain accurate alignment of the fiber cores terminated in the connectors, which is necessary for low loss light coupling, V-shaped ridges 30 are provided on the forward mating end of each connector. Double-ended socket 28 is formed with correspondingly located axially extending V-shaped grooves 32 which mate with ridges 30. As each connector 10 is axially inserted into its respective open end of socket 28, axial ridges 30 mate with axial grooves 32 causing the connectors to enter the socket in a position of accurate lateral, angular and longitudinal alignment for proper coupling of the fiber cores of the fiber optic cables terminated to the connectors. The forward mating end 24 of each connector is provided with chamfered surfaces 34 which facilitate initial insertion of the connectors into the socket openings. The use of a double-ended socket, such as socket 28, is disclosed in copending application Ser. No. 118,365, filed Feb. 4, 1980 and assigned to the assignee of the present invention, and which is incorporated herein by reference.

The connector components are fabricated of plastic material or the like and a pair of integrally molded flexible flaps 36 are provided for holding the connectors mated within the socket. Flaps 36 (FIG. 1) actually are formed by flap portions 36a of each terminal half 20a, 20b of terminal members 20. The flaps are spaced a sufficient distance away from the sides of the forward mating ends of the terminal members so that they are free to flex laterally to some extent. Detents 38 are formed at the front inside edge of each flap or flap portion for seating within detent recesses 40 on the outside of socket 28.

Figure 4:
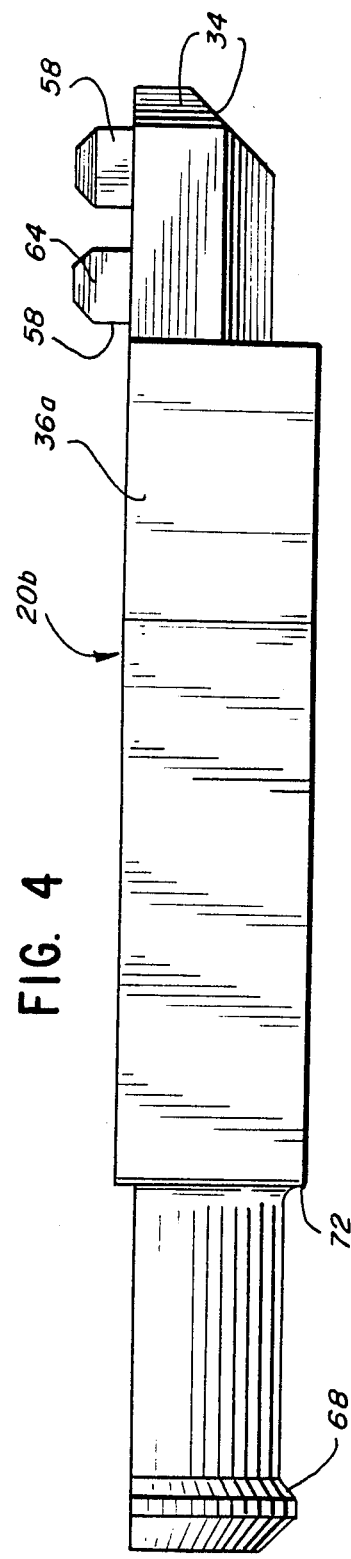
FIG. 4 is a side elevation of the matching half shown in FIG. 3.
Figure 5:
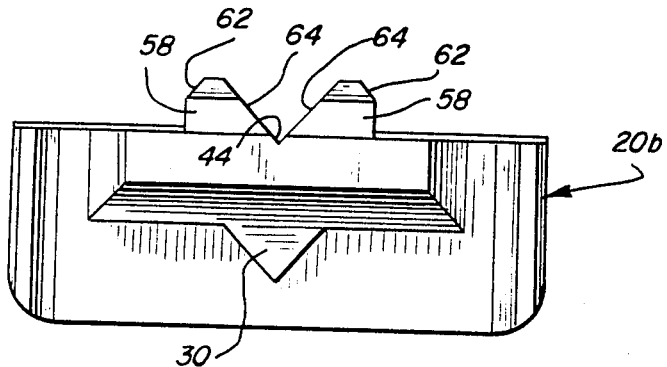
FIG. 5 is an end elevation of the matching half as viewed from the right in FIG. 3.

Referring to FIGS. 3–5, one matching half of terminal member 20 of connector 10 is illustrated in enlarged detail. As stated above, each terminal half is identical for precise alignment of fiber core 14 with respect to the outer dimensions of the connector, particularly the outer dimensions of forward mating end 24. Consequently, only one half is being described herein with the understanding that such terms as "through hole" are intended to refer to the entire terminal member or connector when assembled. Thus, FIGS. 3–5 illustrate the lower terminal half 20b as viewed in FIGS. 1 and 2.

More particularly, each matching half of terminal member 20 includes a groove, generally designated 42, extending axially of the connector. The groove has a first portion 44 extending along forward mating end 24 and sized to receive a length of fiber core 14 stripped of outer coating 16 and to properly position the core with respect to the mating end of the terminal member. Groove 42 has a second portion 46 extending along rear end 26 of the terminal member and sized for receiving outer coating 16 of the fiber optic cable. Terminal halves 20a, 20b are separable along a parting line coincident with center axis 50 of groove 42. It can be seen that the grooves of a pair of matching terminal halves combine to form a through hole extending through the connector when the terminal halves are assembled.

Means is provided in rear portion 46 of groove 42 for clamping the outer coating of the fiber optic cable to prevent lengthwise movement of the cable relative to the terminal member or connector. More particularly, inwardly projecting ridges 54 are formed on the inside of groove portion 46. The ridges terminate in a substantially circumferential sharp edge 56 for gripping the outer coating of the fiber optic cable when the connector is assembled as described in greater detail hereinafter.

Complementary alignment means is provided on the inside mating faces of terminal halves 20a, 20b to facilitate proper mating of the halves. More particularly, a pair of protruding bosses 58 are formed on each terminal half, and a complementary recess 60 also is formed on each terminal half. It is readily apparent that, with the terminal halves being identical, the protruding bosses of each half mate within the recesses of the opposite half when the bosses and recesses are molded in the positions shown in FIG. 3. The distal ends of the bosses are chamfered, as at 62, to facilitate easy mating of the terminal halves.

Guide means also are provided on each terminal half adjacent the forward portion 44 of groove 42 for guiding fiber core 14 transversely into the groove. Herein, the guide means comprises canted surfaces 64 on the inside of each boss 58. It can be seen best in FIG. 5, that canted surfaces 64 are directed toward the bottom of the forward portion 44 of the groove. This will be described in greater detail hereinafter.

Figure 6:
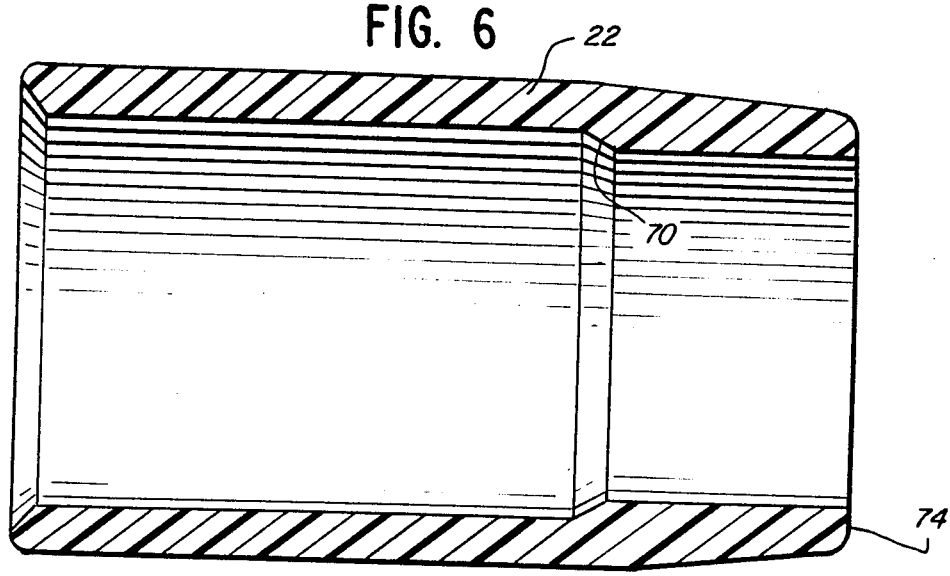
FIG. 6 is a central, longitudinal section through the ferrule member of the connector of the invention.

Ferrule member 22 is positionable over rear end 26 of the terminal member for holding the terminal halves in assembled condition. The ferrule member also provides means for biasing projecting ridges 54 into clamping engagement with outer coating 16 of the fiber optic cable. More particularly, as best seen in FIGS. 3 and 4, the extreme end of the rear end 26 of each terminal member is provided with rearwardly opening slots 66 to provide resiliency at the rear end of the terminal member. In other words, the extreme rear end of the terminal member collapses slightly to permit ferrule member 22 to be moved into position to hold the terminal halves together and to bias projecting ridges 24 into clamping engagement with the outer coating of the cable. A snap-fit is afforded for ferrule member 22 by providing annular groove means 68 at the extreme rear end of the terminal member as illustrated with the terminal half shown in FIGS. 3 and 4. FIG. 6 shows a central longitudinal section through ferrule member 22, with the ferrule member having an annular ridge 70 on the inside thereof. When assembled, this ridge abuts against an annular shoulder 72 (FIGS. 3 and 4) formed on the terminal halves, with the rear end 74 (FIG. 6) of the ferrule member snap-fit behind annular groove means 68 of the terminal halves.

Figure 7:
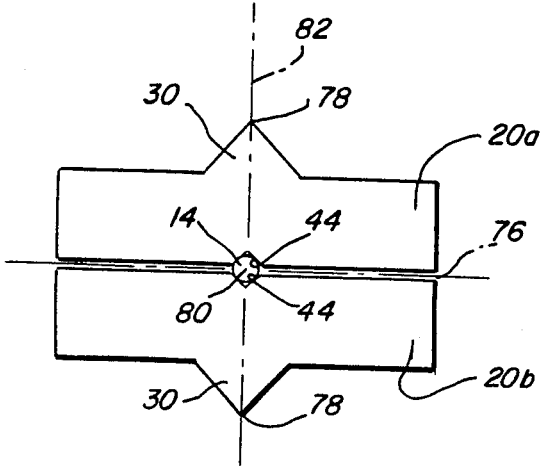
FIG. 7 is an end elevation of the mating end of the connector.

Referring to FIG. 7, the first or forward groove portions 44 which define, in part, the through hole through the connector actually are formed by opposed V-shaped grooves in each terminal half 20a, 20b. These V-shaped grooves positively center fiber core 14 with respect to the mating end of the terminal member. In other words, the slanted sides of the V-shaped grooves naturally bias the fiber core toward the center of the through hole. The depth of the V-shaped grooves is determined in relation to the outside diameter of the fiber core such that there is a clearance, as at 76, between the terminal halves when fully assembled. This insures that there is no free play between the fiber core and the first or forward portion of the through hole defined by groove portions 44, so that the through hole snugly receives and grips the fiber core in proper centered position with respect to the forward mating end of the terminal member.

It is important to note in FIG. 7 that the apexes 78 of axial ridges 30 on each terminal half 20a, 20b are in line with the apexes at the bottom of the respective V-shaped grooves. When a pair of connectors 10 are axially inserted into the open ends of socket 28 (FIG. 2) and axial ridges 30 mate with axial grooves 32 in the socket, absolute alignment of the fiber core 14 is effected in proper centered position with respect to the forward mating end of the terminal member. It can be seen that with this mechanical relationship, the center axis 80 of fiber core 14 is maintained on a center line 82 extending through the apexes of ridges 30 and grooves 44. With the double-ended socket maintaining accurate lateral, angular and longitudinal alignment of the mating ends of the connectors, this absolute centering of the fiber core is afforded regardless of normal tolerances in the diameters of various fibers because of the camming-centering action of V-shaped grooves 44. A similar camming action can be provided with rounded grooves or other similar configurations affording such a camming action. In addition, a V-shaped groove 44 could be provided in only one terminal half, with the other terminal half having a flat surface, yet still affording a camming-centering action. Of course, as stated above, identical terminal halves are preferred to eliminate practically all tolerance problems.

From the foregoing, it is apparent that the mating of a pair of connectors 10 in accordance with the present invention actually aligns the axes of the fiber cores of a mated pair of fiber optic cables.

Referring back to FIGS. 2 and 3, it can be seen that the length of groove portion 44 which defines the forward through hole portion of the connector has considerable length. Heretofore, the "hole" length for a fiber core in conventional fiber optic connectors has been relatively short, on the order of 0.020 to 0.050 inch because the through hole was a completely enclosed aperture surrounding the fiber core, contrary to the open structure provided by the open terminal halves of the present invention. Known molding technology has prevented through holes of greater lengths. The relatively long through hole portion provided by open grooves 44 of the present invention insures angular alignment of the fiber core which heretofore has been impossible with such a simple connector.

Ferrule member 22 is dimensioned so as to provide sufficient clearance between the front end thereof and an outwardly protruding annular shoulder 82 behind flaps 36 of the terminal member to accommodate and hold the strength members common with fiber optic cables, such as Kevlar layers or braided steel wire strengthening layers often used within fiber optic cables. In addition, each terminal half 20a, 20b is provided with a pair of transverse through apertures 84 and a longitudinal groove 86 leading to the apertures. This is provided to accommodate fiber optic cables which utilize one or more wire strands extending longitudinally of the cable as strengthening members. A wire simply is laid into groove 86 with the free end thereof protruding through an aperture 84 and clamped between terminal halves 20a, 20b when assembled. Apertures 88 receive appropriate alignment pins of an assembly tool. However, referring back to FIG. 2, a pair of preassembly pins 90 can be used in conjunction with apertures 88 in one of the matching halves. The preassembly pins can be press-fit into the apertures or molded integrally with one of the matching halves. The pins permit the other matching half to be preassembled onto the pins to maintain the pair of matching halves in a spaced relationship and thereby allow for easy positioning of the fiber optic cable between the matching halves before final assembly. This enables an operator to easily grasp both matching halves with one hand while manually manipulating the fiber optic cable into position with the other hand.

Figure 8:
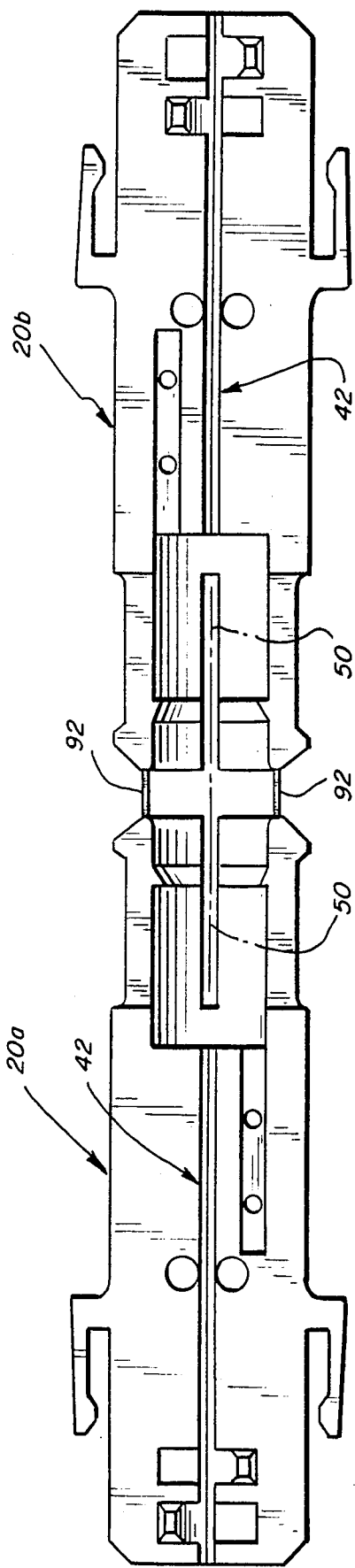
FIG. 8 is a top plan view of a pair of identical connector halves as they would be aligned in a mold for utilizing a common core pin for the fiber grooves.

Referring to FIG. 8, a pair of identical matching halves 20a, 20b of connector 10 are shown in an end-to-end disposition to illustrate a novel method of molding the matching halves to maintain practically negligible tolerances in forming grooves 42 in a pair of the matching halves. More particularly, a double cavity mold is provided with the cavities being identical and machined to form two identical matching halves oriented as shown in FIG. 8. In this manner a common core pin is used, extending through both mold cavities, to form grooves 42 in both matching halves. The common core pin insures that the axes 50 of the grooves in the respective matching halves are precisely aligned relative to the respected terminal ends of the matching halves. The problem of tolerances between the grooves of a pair of matching halves for a single connector is practically eliminated.

Furthermore, webs 92 (FIG. 8) can be molded between the matching halves to insure that the two matching halves which have been molded with a common core pin are ultimately assembled in the same connector. A single part number can be used for the joined matching halves. The joined halves can be packaged and shipped as a single unit. Webs 92 can be molded to be easily and clearly broken off when the matching halves are assembled in a connector, or made to be a living hinge for the matching halves.

From the foregoing, it can be seen that a new and improved fiber optic connector has been provided which is simple and of low cost and can be fabricated entirely of molded plastic material. The connector has very low insertion loss for a low cost connector. Initial testing has shown the insertion losses to be on the order of 1.5 dB. The connector is capable of holding, clamping or gripping all elements of a fiber optic cable, such as the outer coating, the strength members and the naked fiber itself. The connector is provided with an open design for easy assembly and has means for guiding the fiber core transversely into the through hole of the connector. The connector eliminates all extraneous interior components such as bushings, centering rollers, internal sleeves and the like which are prevalent with many prior art fiber optic connectors. By eliminating epoxy materials which also are prevalent in some known connectors, the components of the connector of this invention are reusable and can be repeatedly assembled. The identical terminal halves provide for precise alignment of the fiber core with respect to the outer dimensions of the terminal member or connector. The connector is readily applicable for separable in-line applications such as by employing a simple connecting female socket or sleeve. Once assembled, the connector of this invention substantially eliminates all relative movement between all elements of the fiber optic cable itself as well as between the cable elements and the connector components.

What is claimed is:

1. A fiber optic connector for optically coupling a pair of fiber optic cables or coupling a single fiber optic cable and a light source or detector, said cable having an outer coating about an inner fiber core, comprising: a terminal member defined by a pair of matching halves having complementary groove means defining a through hole extending axially therethrough, said through hole having a first portion extending between forward mating end portions of said matching halves and sized to snugly receive a length of said fiber core stripped of said outer coating and properly positioning said core with respect to the mating end of the terminal member, said through hole having a second portion extending between rear end portions of said matching halves and sized for receiving said outer coating of said fiber optic cable, means in said second portion of said through hole for clamping said outer coating to prevent lengthwise movement of said fiber optic cable relative to said terminal member, and means positionable over said rear ends of said matching halves for biasing said clamping means against said outer coating of said fiber optic cable.

2. The fiber optic connector of claim 1 wherein said terminal member comprises a pair of matching halves separable along a parting line coincident with the axis of said through hole.

3. The fiber optic connector of claim 2, including means for holding the matching halves of the terminal member together to retain the fiber optic cable therein.

4. The fiber optic connector of claim 3 wherein said means for clamping the outer coating of the fiber optic cable comprises projecting means within the second portion of the through hole.

5. The fiber optic connector of claim 4 wherein said holding means comprises a ferrule member positionable over the rear end of the terminal member for biasing said projecting means into clamping engagement with the outer coating of the fiber optic cable.

6. The fiber optic connector of claim 5 wherein the rear portion of the terminal member is resilient to facilitate the clamping action of said projecting means.

7. The fiber optic connector of claim 5, including complementary engaging means between the rear portion of the terminal member and said ferrule member to provide a snap-fit of the ferrule member onto said rear portion.

8. The fiber optic connector of claim 2 wherein the first portion of said through hole is defined by axially extending V-shaped grooves in said matching halves for centering the fiber core with respect to the mating end of the terminal member.

9. The fiber optic connector of claim 2, including guide means on at least one of said matching halves adjacent the first portion of the through hole for guiding the fiber core transversely thereinto.

10. The fiber optic connector of claim 2, including complementary alignment means on said matching halves to facilitate proper mating of the halves.

11. The fiber optic connector of claim 10 wherein said alignment means includes guide means adjacent the first portion of the through hole for guiding the fiber core transversely thereinto.

12. The fiber optic connector of claim 11 wherein said alignment means comprises a protruding boss on at least one of the matching halves and a complementary recess for receiving the boss on the other of the matching halves, and said guide means compries a canted surface on the boss directed toward the first portion of the through hole.

13. The fiber optic connector of claim 2 wherein said matching halves are identical in construction.

14. The fiber optic connector of claim 1 wherein the fiber optic cable includes a strength member, and including means for clamping said strength member and means for clamping said fiber core whereby all elements of the fiber optic cable are securely held in the connector.

15. A fiber optic connector for optically coupling a pair of fiber optic cables or coupling a single fiber optic cable and a light source or detector, said cable having an outer coating about an inner fiber core, comprising:
- a terminal member including a pair of identical matching halves defining a through hole extending axially therethrough, said through hole having a first portion extending through a mating end of said terminal member and sized to snugly receive a length of said fiber core stripped of said outer coating and properly positioning said core with respect to said mating end of said terminal member, said through hole having a second portion extending through a rear end of said terminal member and sized for receiving said outer coating of said fiber optic cable, and projecting means in said second portion of said through hole for clamping said outer coating to prevent lengthwise movement of said fiber optic cable relative to said terminal member; and
- a ferrule member positionable over said rear end of said terminal member for biasing said projecting means into clamping engagement with said outer coating of said fiber optic cable.

16. The fiber optic connector of claim 15 wherein the rear portion of the terminal member is resilient to facilitate the clamping action of said projecting means.

17. The fiber optic connector of claim 16, including complementary engaging means between the rear portion of the terminal member and said ferrule member to provide a snap-fit of the ferrule member onto said rear portion.

18. The fiber optic connector of claim 15 wherein the first portion of said through hole is defined by axially extending V-shaped grooves in said matching halves for centering the fiber core with respect to the mating end of the terminal member.

19. The fiber optic connector of claim 15, including guide means on at least one of said matching halves adjacent the first portion of the through hole for guiding the fiber core transversely thereinto.

20. The fiber optic connector of claim 15, including complementary alignment means on said matching halves to facilitate proper mating of the halves.

21. The fiber optic connector of claim 20 wherein said alignment means includes guide means adjacent the first portion of the through hole for guiding the fiber core transversely thereinto.

22. The fiber optic connector of claim 21 wherein said alignment means comprises a protruding boss on at least one of the matching halves and a complementary recess for receiving the boss on the other of the matching halves, and said guide means comprises a canted surface on the boss directed toward the first portion of the through hole.

23. A fiber optic connector for optically coupling a pair of fiber optic cables or coupling a single fiber optic cable and a light source or detector, said cable having an outer coating about an inner fiber core, comprising:
- a terminal member including a pair of matching halves having complementary front end portions which, when assembled, form a flush front mating end of said terminal member;
- an open groove formed in at least one of said matching halves and extending through said mating end for receiving a length of said fiber core stripped of said outer coating and properly positioning said fiber core with respect to said mating end of said terminal member, and the other matching half cooperating with said one matching half for holding said fiber core in proper position in said groove when said matching halves are assembled; and
- means positionable about said matching halves of said terminal member for holding said matching halves together to retain said fiber optic cable therein.

24. The fiber optic connector of claim 23 wherein the depth of said groove is less than the diameter of the fiber core to clamp the core therein when the matching halves are assembled.

25. The fiber optic connector of claim 23, including one of said grooves in each of said matching halves in opposed relationship for receiving and positioning the fiber core.

26. The fiber optic connector of claim 25 wherein the combined depth of said grooves is less than the diameter of the fiber core to clamp the core therein when the matching halves are assembled.

27. The fiber optic connector of claim 26 wherein said grooves have camming surfaces for centering the fiber core with respect to the mating end of the terminal member.

28. The fiber optic connector of claim 27, including axially extending alignment ridges on the outside of each of said matching halves in line with said grooves for receipt in complementary axial grooves in an appropriate female receptacle.

29. The fiber optic connector of claim 27 wherein said grooves are generally V-shaped.

30. The fiber optic connector of claim 29, including axially extending, generally V-shaped alignment ridges on the outside of each of said matching halves for receipt in complementary axial grooves in an appropriate female receptacle, the apexes of the V-shaped ridges and the V-shaped grooves all being on a common line when the matching halves are assembled.

31. The fiber optic connector of claim 25 wherein said matching halves are identical in construction.

32. The fiber optic connector of claim 23, including complementary alignment means on said matching halves to facilitate proper mating of the halves.

33. The fiber optic connector of claim 23, including guide means on said one matching half adjacent said groove for guiding the fiber core transversely thereinto.

34. A fiber optic connector for optically coupling a pair of fiber optic cables or coupling a single fiber optic cable and a light source or detector, said cable having an outer coating about an inner fiber core, comprising:
- a terminal member including a pair of matching halves having complementary front end portions which, when assembled, form a flush front mating end of said terminal member;

groove means formed between opposed mating faces of said matching halves and extending through said mating end for receiving a length of said fiber core stripped of said outer coating and properly positioning said fiber core with respect to said mating end of said terminal member; and means positionable about said matching halves of said terminal member for holding said matching halves together to retain said fiber core in said groove means.

35. The fiber optic connector of claim 34 wherein the depth of said groove means is less than the diameter of the fiber core to clamp the core therein when the matching halves are assembled.

* * * * *